United States Patent
Elliott

Patent Number: 5,923,765
Date of Patent: Jul. 13, 1999

[54] DUAL FUNCTION PORTABLE STEREO SYSTEM

[76] Inventor: Bruce Elliott, 987 Myrtle Ave., 1F, Brooklyn, N.Y. 11206

[21] Appl. No.: 08/630,946

[22] Filed: Apr. 5, 1996

[51] Int. Cl.$^6$ .................................................. H04B 1/00
[52] U.S. Cl. ............................................. 381/86; 455/345
[58] Field of Search .............................. 381/86, 104, 120, 381/109, 123; 455/345, 346, 347, 348, 351

[56] References Cited

U.S. PATENT DOCUMENTS

| | | | |
|---|---|---|---|
| 4,602,358 | 7/1986 | Sato | 381/86 |
| 4,734,897 | 3/1988 | Schotz | 381/86 |
| 4,807,292 | 2/1989 | Sorscher | 381/86 |
| 5,161,131 | 11/1992 | Borchardt | 381/86 |
| 5,263,199 | 11/1993 | Barnes et al. | 381/86 |
| 5,285,500 | 2/1994 | Mantz | 381/86 |
| 5,339,362 | 8/1994 | Harris | 381/86 |
| 5,341,434 | 8/1994 | Kawamoto | 455/345 |
| 5,546,273 | 8/1996 | Harris | 455/345 |

*Primary Examiner*—Curtis Kuntz
*Assistant Examiner*—Xu Mei

[57] ABSTRACT

A dual function portable stereo unit including a portable playback mechanism adapted to generate an unamplified audio signal upon the actuation thereof. The playback mechanism comprising a standard output jack for communicating the audio signal therefrom whereby the playback mechanism may be employed portably with a set of standard headphones in a first mode of operation. An amplifier and associated speakers are adapted to allow the amplification of the unamplified audio signal and further transmit the amplified audio signal via free space. A control unit is situated within a glove box of a vehicle and electrically connected to the inputs of the amplifier for manipulating the unamplified audio signal and further allowing the selective transmission thereof to the amplifier. The control unit further includes an input jack adapted to receive the unamplified audio signal and allow the employment of the playback mechanism within the car as a car stereo in a second mode of operation. Finally, a control unit is adapted to releasably couple between the input jack of the control unit and output jack of the playback mechanism for allowing the transmission of the unamplified audio signal from the playback mechanism to the control unit.

4 Claims, 4 Drawing Sheets

DUAL FUNCTION PORTABLE STEREO SYSTEM

BACKGROUND OF THE INVENTION

1. Field of the Invention

The present invention relates to a dual function portable stereo system and more particularly pertains to precluding the theft of a vehicle stereo system while simultaneously allowing the dual usage of a conventional portable radio and playback mechanism.

2. Description of the Prior Art

The use of portable stereo units is known in the prior art. More specifically, portable stereo units heretofore devised and utilized for the purpose of portably transmitting music are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,501,013 to Sato; U.S. Pat. No. 4,712,250 to Michels et al.; U.S. Des. Pat. 350,756 to Zelios; U.S. Pat. No. 5,381,684 to Kawamura; U.S. Pat. No. 5,319,716 to McGreevy; and U.S. Pat. No. 5,327,132 to Whitecar et al. are provided as being of general interest.

In this respect, the dual function portable stereo system according to the present invention substantially departs from the conventional concepts and designs of the prior art, and in so doing provides an apparatus primarily developed for the purpose of precluding the theft of a vehicle stereo system while simultaneously allowing the dual usage of a conventional portable radio and playback mechanism.

Therefore, it can be appreciated that there exists a continuing need for a new and improved dual function portable stereo system which can be used for precluding the theft of a vehicle stereo system while simultaneously allowing the dual usage of a conventional portable radio and playback mechanism. In this regard, the present invention substantially fulfills this need.

SUMMARY OF THE INVENTION

In view of the foregoing disadvantages inherent in the known types of portable stereo units now present in the prior art, the present invention provides an improved dual function portable stereo system. As such, the general purpose of the present invention, which will be described subsequently in greater detail, is to provide a new and improved dual function portable stereo system which has all the advantages of the prior art and none of the disadvantages.

To attain this, the present invention essentially comprises a portable radio and cassette player adapted to generate an unamplified audio signal upon the actuation thereof. The radio and cassette player comprises a standard output jack for communicating the audio signal therefrom. Thus, in a first mode of operation, the radio and cassette player may be employed portably with a set of standard headphones. For securing the radio and cassette player to a glove box of a vehicle in an open orientation, a first mounting mechanism is included. An amplifier is situated in a trunk of the vehicle. The amplifier comprises a plurality of inputs and outputs whereby the amplifier is adapted to receive an unamplified audio signal via the inputs, allow the amplification thereof, and communicate an amplified audio signal via the outputs. Also included are a plurality of speakers situated within the vehicle and electrically connected to the outputs of the amplifier. The speakers are adapted to transmit the amplified audio signal via free space upon the receipt thereof. A specially designed filtering control unit is situated within the glove box of the vehicle and electrically connected to the inputs of the amplifier for manipulating an unamplified audio signal and further allowing the selective transmission thereof to the amplifier. The filtering control unit has a front face, a rear face, a top surface, a bottom surface, and a pair of side faces defining an interior space. The filtering control unit further includes an input jack situated on the front face and is adapted to receive the unamplified audio signal. A plurality of filtering levers are situated on the front face thereof and are adapted to selectively attenuate predetermined frequencies of the unamplified audio signal. For controlling the volume level of the unamplified audio signal, a volume dial is situated on the front face of the filtering control unit. A power button is situated on the front face and is adapted to preclude the transmission of the unamplified audio signal to the amplifier. The power button is also adapted to allow the transmission of the unamplified audio signal to the amplifier thus allowing the employment of the radio and cassette player within the car as a car stereo in a second mode of operation. A second mounting mechanism comprises a flange with a pair of associated apertures formed on a side face thereof for allowing the securement of the filtering control unit within the glove box with a pair of bolts and coupling screws. Finally, a control line comprises a first end adapted to releasably couple with the output jack of the radio and cassette player. A second end of the control line is adapted to releasably couple with the input jack of the filtering control unit for allowing the transmission of the unamplified audio signal from the radio and cassette player to the filtering control unit.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dual function portable stereo system which has all the advantages of the prior art portable stereo units and none of the disadvantages.

It is another object of the present invention to provide a new and improved dual function portable stereo system which may be easily and efficiently manufactured and marketed.

It is a further object of the present invention to provide a new and improved dual function portable stereo system which is of a durable and reliable construction.

An even further object of the present invention is to provide a new and improved dual function portable stereo system which is susceptible of a low cost of manufacture with regard to both materials and labor, and which accordingly is then susceptible of low prices of sale to the consuming public, thereby making such dual function portable stereo system economically available to the buying public.

Still yet another object of the present invention is to provide a new and improved dual function portable stereo system which provides in the apparatuses and methods of the prior art some of the advantages thereof, while simultaneously overcoming some of the disadvantages normally associated therewith.

Still another object of the present invention is to preclude the theft of a vehicle stereo system while simultaneously allowing the dual usage of a conventional portable radio and playback mechanism.

Lastly, it is an object of the present invention to provide a new and improved dual function portable stereo unit including a portable playback mechanism adapted to generate an unamplified audio signal upon the actuation thereof. The playback mechanism comprising a standard output jack for communicating the audio signal therefrom whereby the playback mechanism may be employed portably with a set of standard headphones in a first mode of operation. An amplifier and associated speakers are adapted to allow the amplification of the unamplified audio signal and further transmit the amplified audio signal via free space. A control unit is situated within a glove box of a vehicle and electrically connected to the inputs of the amplifier for manipulating the unamplified audio signal and further allowing the selective transmission thereof to the amplifier. The control unit further includes an input jack adapted to receive the unamplified audio signal and allow the employment of the playback mechanism within the car as a car stereo in a second mode of operation. Finally, a control unit is adapted to releasably couple between the input jack of the control unit and output jack of the playback mechanism for allowing the transmission of the unamplified audio signal from the playback mechanism to the control unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
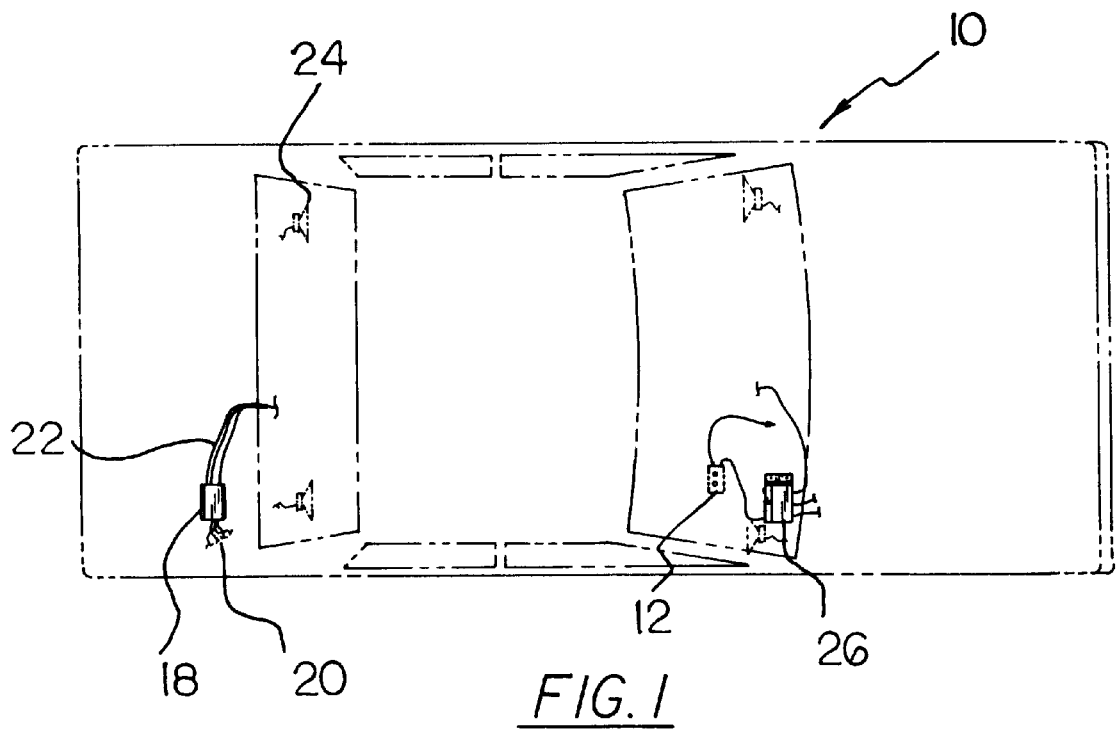
FIG. 1 is a plan view of the preferred embodiment of the dual function portable stereo system constructed in accordance with the principles of the present invention.
Figure 2:
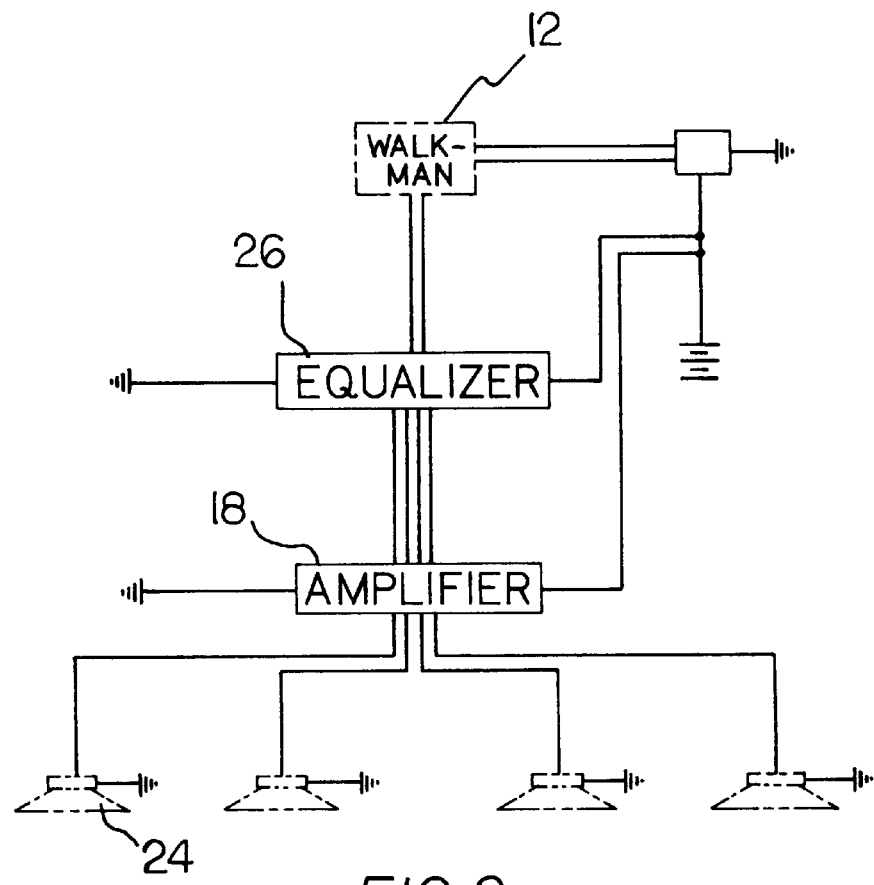
FIG. 2 is a schematic of the circuitry employed in the present invention.
Figure 3:
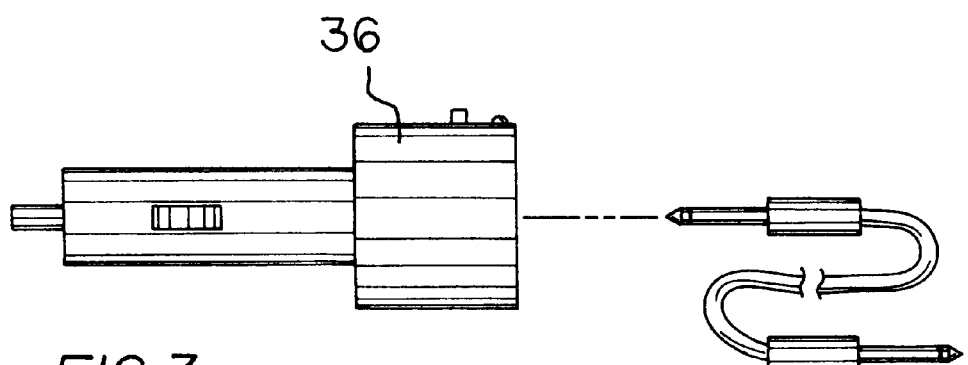
FIG. 3 is a side plan view of the power adapter capable of supplying power to the portable radio and cassette player in the second mode of operation.
Figure 4:
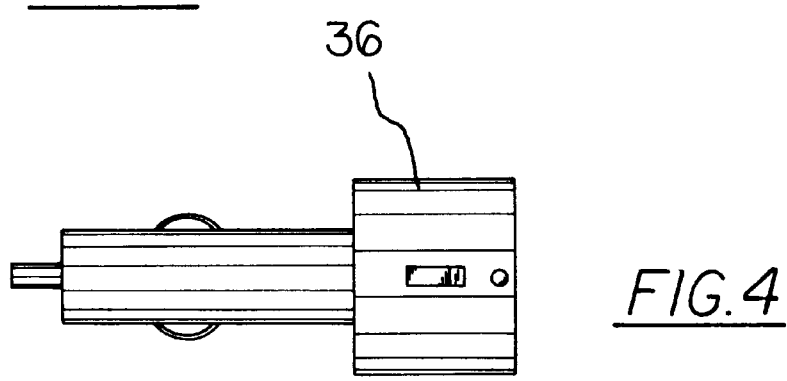
FIG. 4 is a top plan view of the power adapter.
Figure 5:
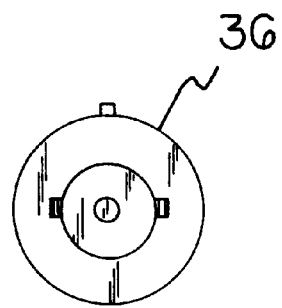
FIG. 5 is a front plan view of the power adapter.
Figure 6:
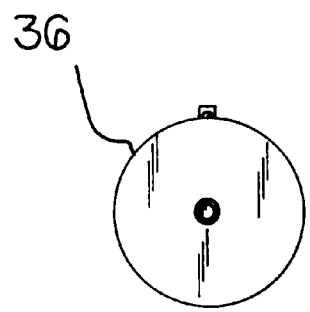
FIG. 6 is a rear plan view of the power adapter.
Figure 7:
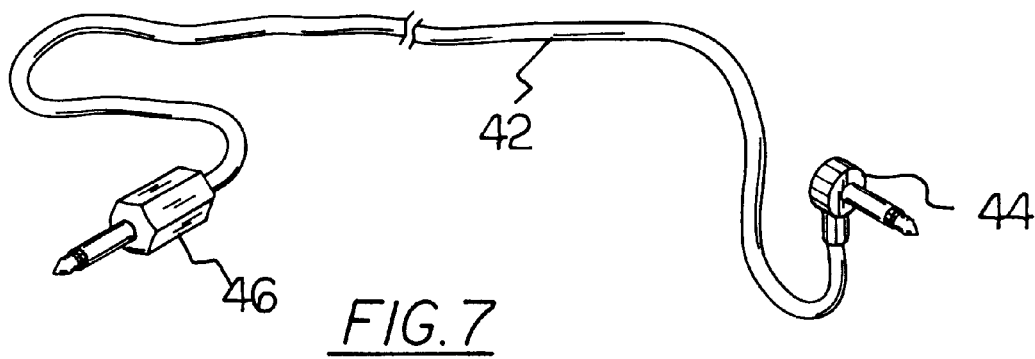
FIG. 7 is a perspective illustration of the control line of the present invention.
Figure 8:
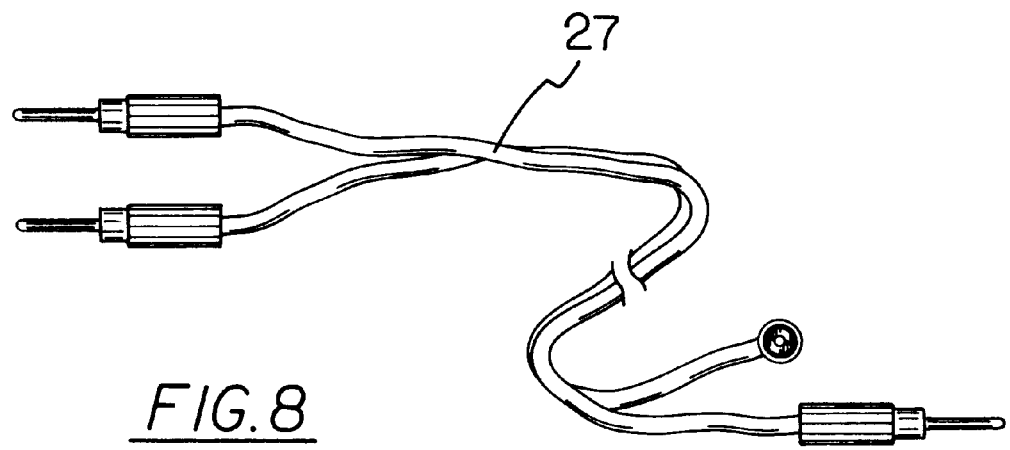
FIG. 8 is a perspective view of the interconnecting cables employed to couple the amplifier and the filtering control unit.
Figure 9:
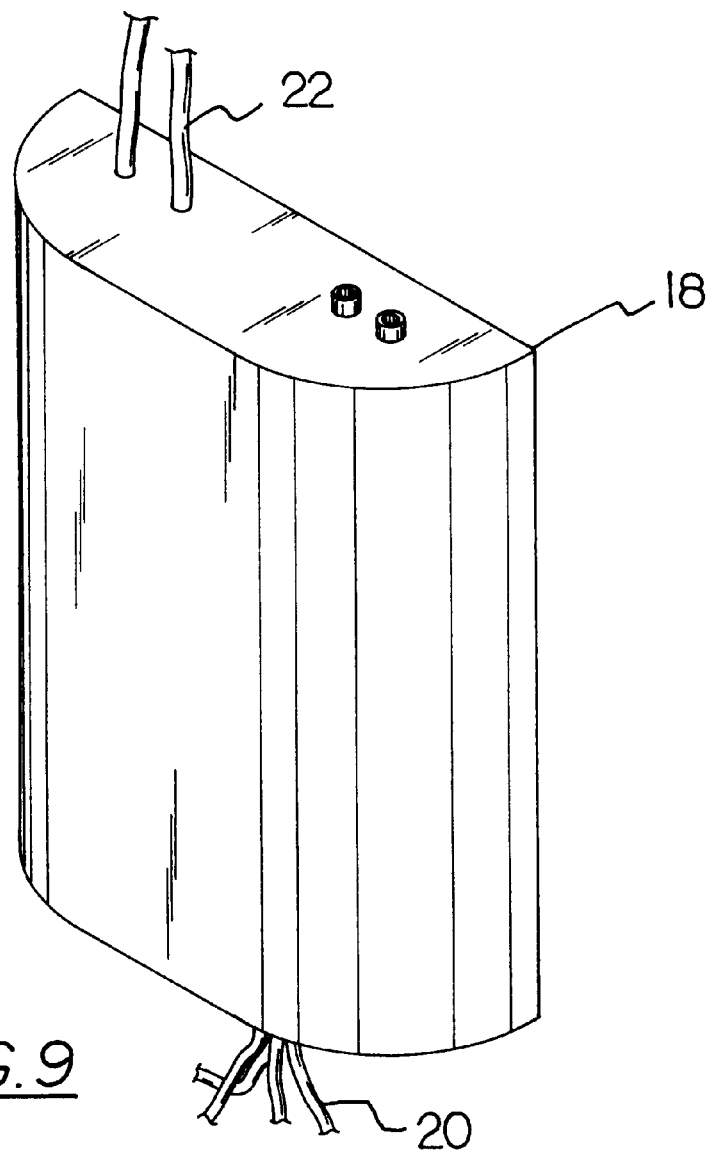
FIG. 9 is a perspective view of the amplifier employed in the present invention.
Figure 10:
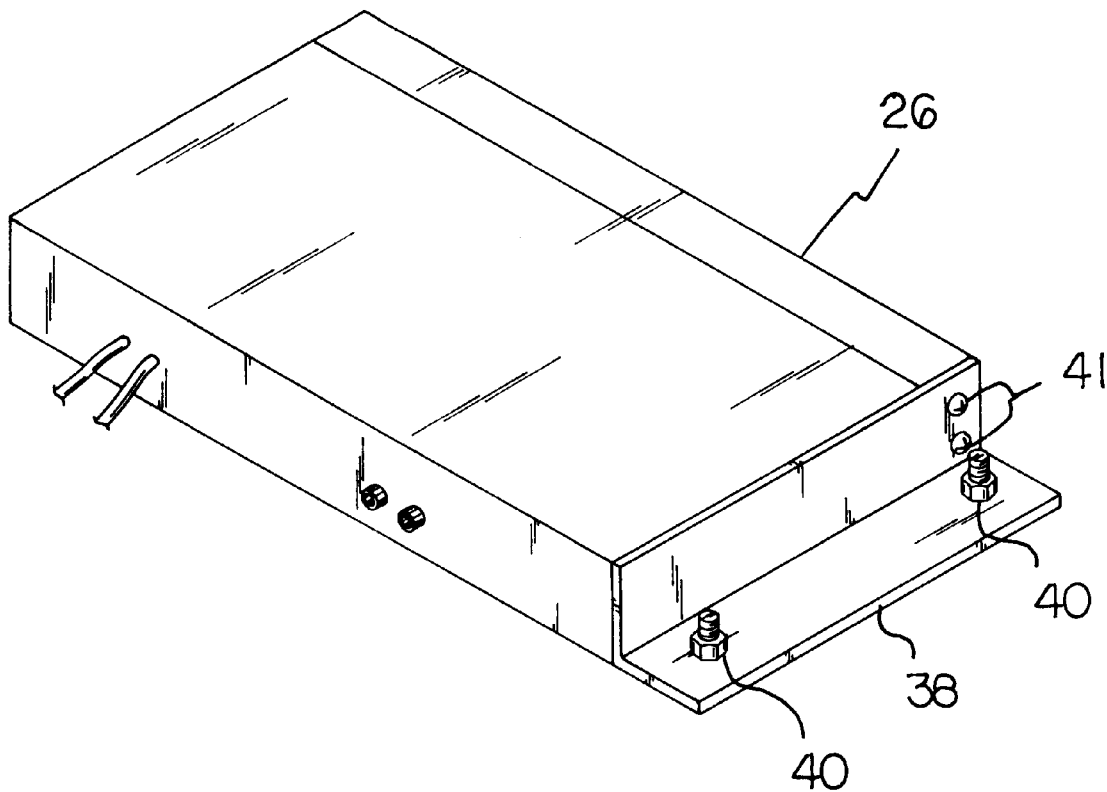
FIG. 10 is a perspective depiction of the filtering control unit with the associated mounting mechanism.
Figure 11:
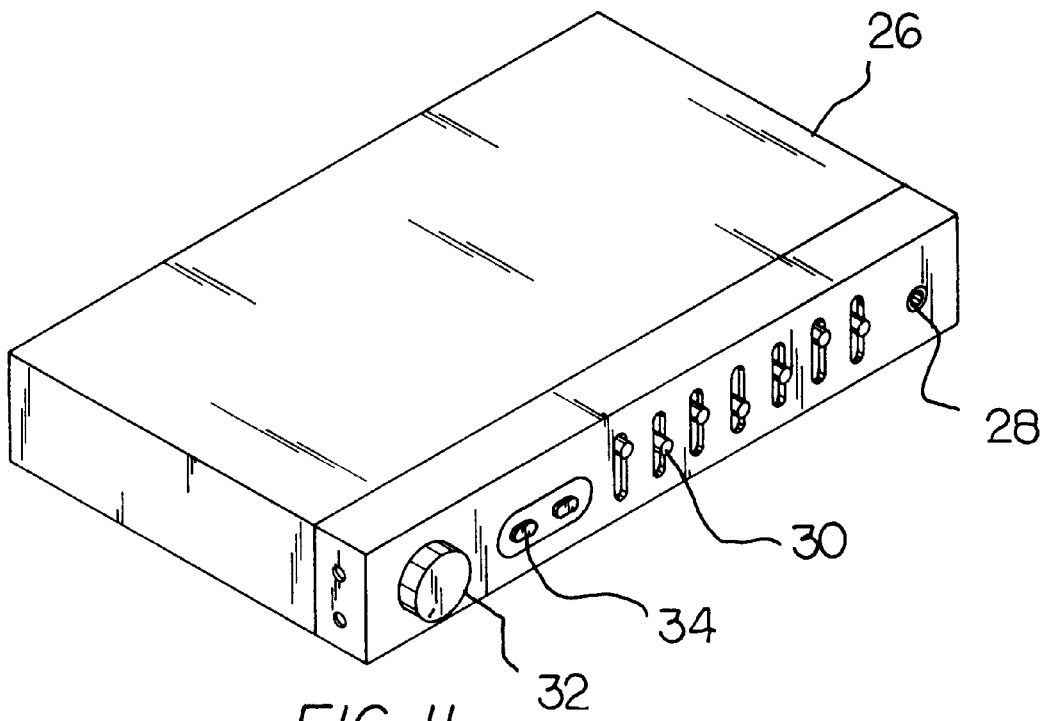
FIG. 11 is a perspective view of the filtering control unit and the control keys associated therewith.

With reference now to the drawings, and in particular to FIG. 1 thereof, a new and improved dual function portable stereo system embodying the principles and concepts of the present invention and generally designated by the reference numeral 10 will be described.

The present invention, the new and improved dual function portable stereo system, is comprised of a plurality of components. Such components in their broadest context include a portable radio and cassette player, first mounting mechanism, amplifier, speakers, filtering control unit, power adapter, second mounting mechanism, and control line. Such components are individually configured and correlated with respect to each other so as to attain the desired objective.

More specifically, it will be noted that the system 10 of the present invention includes a portable radio and cassette player 12 adapted to generate an unamplified audio signal upon the actuation thereof. The radio and cassette player comprises a standard output jack for communicating the unamplified audio signal therefrom. Thus, in a first mode of operation, the radio and cassette player may be employed portably with a set of standard headphones. It should be noted that any type of playback mechanism such as a compact disc player may be employed in lieu of or in combination with the radio and cassette player.

For securing the radio and cassette player to a glove box of a vehicle in an open orientation, a first mounting mechanism is included. Any one of numerous mounting mechanisms such as a pile-type fastener may be utilized in order afford the quick and effortless retroffiting of the radio and cassette player to the glove box. Such a glove box is preferably equipped with a locking mechanism.

An amplifier 18 is situated in a trunk of the vehicle. The amplifier comprises a plurality of inputs 20 and outputs 22 whereby the amplifier is adapted to receive an unamplified audio signal via the inputs, allow the amplification thereof, and communicate an amplified audio signal via the outputs. Ideally, the amplifier has a height of approximately 2 inches, a length of approximately 4 and ½ inches, and a width of approximately 5 inches.

Also included are a plurality of speakers 24 situated within the vehicle and electrically connected to the outputs of the amplifier. The speakers are adapted to transmit the amplified audio signal via free space upon the receipt thereof.

A specially designed filtering control unit 26 is situated within the glove box of the vehicle and electrically connected to the inputs of the amplifier via interconnection cables 27 for manipulating an unamplified audio signal and further allowing the selective transmission thereof to the amplifier. The filtering control unit has a front face, a rear face, a top surface, a bottom surface, and a pair of side faces defining an interior space. Ideally, the amplifier has a height of approximately 1 inch, a length of approximately 4 inches, and a width of approximately 7 inches.

The filtering control unit further includes an input jack 28 situated on the front face thereof and unamplified to receive the unamplified audio signal. A plurality of filtering levers 30 are situated on the front face and are adapted to selectively attenuate predetermined frequencies of the unamplified audio signal. For controlling the volume level of the unamplified audio signal, a volume dial 32 is situated on the front face. A power button 34 is situated on the front face and is adapted to preclude the transmission of the unamplified audio signal to the amplifier. The power button is also adapted to allow the transmission of the unamplified audio signal to the amplifier thus allowing the employment of the radio and cassette player within the car as a car stereo in a second mode of operation. For supplying power to the portable radio and cassette player during use in a second mode of operation, a standard vehicle power adapter 36 is releasably coupled thereto. The vehicle power adapter is also adapted to both recharge batteries within the radio and cassette player while simultaneously powering the device thus employing the second mode of operation as a recharging period.

A second mounting mechanism 38 comprises a flange with a pair of associated apertures formed in a side face thereof for allowing the securement of the filtering control unit within the glove box with a pair of bolts 40 and coupling screws 41. By securing and concealing the filtering control unit within the glove box of the vehicle, the present invention affords a novel theft prevention measure.

Finally, a control line 42 comprises a first end 44 adapted to releasably couple with the output jack of the radio and cassette player. A second end 46 of the control line is adapted to releasably couple with the input jack of the filtering control unit for allowing the transmission of the unamplified audio signal from the radio and cassette player to the filtering control unit. Both ends of the control line suitably comprise an ⅛ inch plug-in jack.

In use, the present invention, in the first mode of operation, may be utilized conventionally as a walkman or a portable hand held radio with associated headphones. Upon being used in the second mode of operation, the head phones may be removed from the walkman and the control line may be used to quickly connect the walkman to the filtering control unit. The radio and cassette player of the present invention may be replaced with a portable television to effect similar advantages. Note should be taken that the dual function portable stereo system does not require the use of installation kits required of similar devices which lack the portable nature of the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved dual function portable stereo system comprising, in combination:

a portable radio and cassette player adapted to generate an unamplified audio signal upon the actuation thereof, the radio and cassette player comprising a standard output jack for coupling with a set of standard headphones in a first mode of operation;

mounting means for releasably securing the radio and cassette player to a glove box of a vehicle in an open orientation;

an amplifier situated in a trunk of the vehicle, the amplifier comprising a plurality of inputs and outputs whereby the amplifier is adapted to receive an unamplified audio signal via the inputs;

a plurality of speakers situated within the vehicle and electrically connected to the outputs of the amplifier, the speakers adapted to transmit the amplified audio signal via free space upon the receipt thereof;

a filtering control unit situated within the glove box of the vehicle and electrically connected to the inputs of the amplifier for manipulating an unamplified audio signal and further allowing the selective transmission thereof to the amplifier, the filtering control unit having a front face, a rear face, a top surface, a bottom surface, and a pair of side faces defining an interior space, the filtering control unit further including an input jack situated on the front face and adapted to receive the unamplified audio signal, a plurality of filtering levers situated on the front face and adapted to selectively attenuate predetermined frequencies of the unamplified audio signal, a volume dial situated on the front face and adapted to control the volume level of the unamplified audio signal, and a power button situated on the front face and adapted to preclude the transmission of the unamplified audio signal to the amplifier and further adapted to allow the transmission of the unamplified audio signal to the amplifier thus allowing the employment of the radio and cassette player within the car as a car stereo in a second mode of operation;

a standard vehicle power adapter coupleable to the radio and cassette player for supplying power thereto in a second mode of operation;

a control unit mounting means comprising a flange with a pair of associated apertures on a side face thereof for allowing the securement of the filtering control unit within the glove box with a pair of bolts and coupling screws; and a control line comprising a first end adapted to releasably couple with the output jack of the radio and cassette player and a second end adapted to releasably couple with the input jack of the filtering control unit for allowing the transmission of the unamplified audio signal from the radio and cassette player to the filtering control unit.

2. A dual function portable stereo system comprising:

a portable playback means adapted to generate an unamplified audio signal upon the actuation thereof, the playback means comprising a standard output jack for coupling with a set of standard headphones in a first mode of operation;

an amplifier comprising a plurality of inputs and outputs whereby the amplifier is adapted to receive an unamplified audio signal via the inputs;

a plurality of speakers situated within the vehicle and electrically connected to the outputs of the amplifier, the speakers adapted to transmit the amplified audio signal via free space upon the receipt thereof;

a control unit situated within the glove box of the vehicle and electrically connected to the inputs of the amplifier for manipulating an unamplified audio signal and further allowing the selective transmission thereof to the amplifier, the control unit further including an input jack situated on a front face thereof and adapted to receive the unamplified audio signal and a power button situated on the front face and adapted to preclude the transmission of the unamplified audio signal to the amplifier and further adapted to allow the transmission of the unamplified audio signal to the amplifier thus allowing the employment of the playback means within the car as a car stereo in a second mode of operation;

a control line comprising a first end adapted to releasably couple with the output jack of the playback means and a second end adapted to releasably couple with the input jack of the control unit for allowing the transmission of the unamplified audio signal from the playback means to the control unit.

3. A dual function portable stereo system as set forth in claim 2 and further comprising:

mounting means for securing the playback means to a glove box of a vehicle in an open orientation; and a control unit mounting means comprising a flange with a pair of associated apertures formed on a side face thereof for allowing the securement thereof within the glove box with a pair of bolts and coupling screws.

4. A dual function portable stereo system as set forth in claim 2 and further comprising:

a plurality of filtering levers situated on the control unit and adapted to selectively attenuate predetermined frequencies of the unamplified audio signal; and a volume dial situated on the front face of the control unit and adapted to control the volume level of the unamplified audio signal.

* * * * *